United States Patent [19]
Whitman et al.

[11] Patent Number: 5,735,551
[45] Date of Patent: Apr. 7, 1998

[54] PIPE REPAIR APPARATUS AND METHOD

[75] Inventors: Gerald E. Whitman, Morris; Matthew D. Krouse, Naperville; Kenneth R. Sturtecky, Geneseo; Thomas J. Behringer, Bartlett, all of Ill.

[73] Assignee: Commonwealth Edison Company, Chicago, Ill.

[21] Appl. No.: 697,312

[22] Filed: Aug. 22, 1996

[51] Int. Cl.$^6$ .................................................... F16L 55/178
[52] U.S. Cl. .................... 285/15; 285/179; 285/191; 285/906; 29/463
[58] Field of Search ........................... 285/15, 906, 158, 285/191, 185, 179; 29/463

[56] References Cited

U.S. PATENT DOCUMENTS

| | | |
|---|---|---|
| 793,589 | 6/1905 | Kellogg ............... 285/15 X |
| 1,575,432 | 3/1926 | Lewis . |
| 2,336,656 | 12/1943 | Van Uum . |
| 2,380,735 | 7/1945 | Ebel et al. ............. 285/191 X |
| 2,412,394 | 12/1946 | Giles . |
| 2,428,381 | 10/1947 | Parry ................. 285/191 X |
| 2,438,412 | 3/1948 | Morris . |
| 2,440,864 | 5/1948 | Liss . |
| 2,460,352 | 2/1949 | Jensen . |
| 3,517,701 | 6/1970 | Smith . |
| 3,689,110 | 9/1972 | Ferguson . |
| 3,944,260 | 3/1976 | Petroczky . |
| 4,461,498 | 7/1984 | Kunsman . |
| 4,633,913 | 1/1987 | Carty et al. . |
| 4,870,856 | 10/1989 | Sharp . |
| 4,886,305 | 12/1989 | Martin . |
| 5,022,684 | 6/1991 | Eagon . |
| 5,449,204 | 9/1995 | Greene et al. . |

*Primary Examiner*—Dave W. Arola
*Attorney, Agent, or Firm*—Brinks Hofer Gilson & Lione

[57] ABSTRACT

A pipe repair apparatus includes first and second housings that are bolted together to form a closed conduit extending between the ends of the housings. This conduit is shaped to received a pipe to be repaired. A first seal is mounted in the housing to seal against an outer circumferential surface of the pipe, and a second seal is mounted to extend around the conduit at an end of the housings to seal the housings against a wall extending outwardly from the pipe. A retainer is coupled to the housings to clamp the second seal against the wall. This retainer can include a threaded rod that passes through the housings or a spring that biases the housings toward the wall. The disclosed pipe repair is well suited for repairing a supply pipe in an internal core spray system of a nuclear reactor. This pipe repair forms a permanent repair that structurally replaces the pipe and welds being repaired. It is well suited for remote installation with minimal as-built information and in a minimal time. The repair provides an effective leakage barrier, and it allows inspection access to adjacent welds that are not covered by the repair.

13 Claims, 5 Drawing Sheets

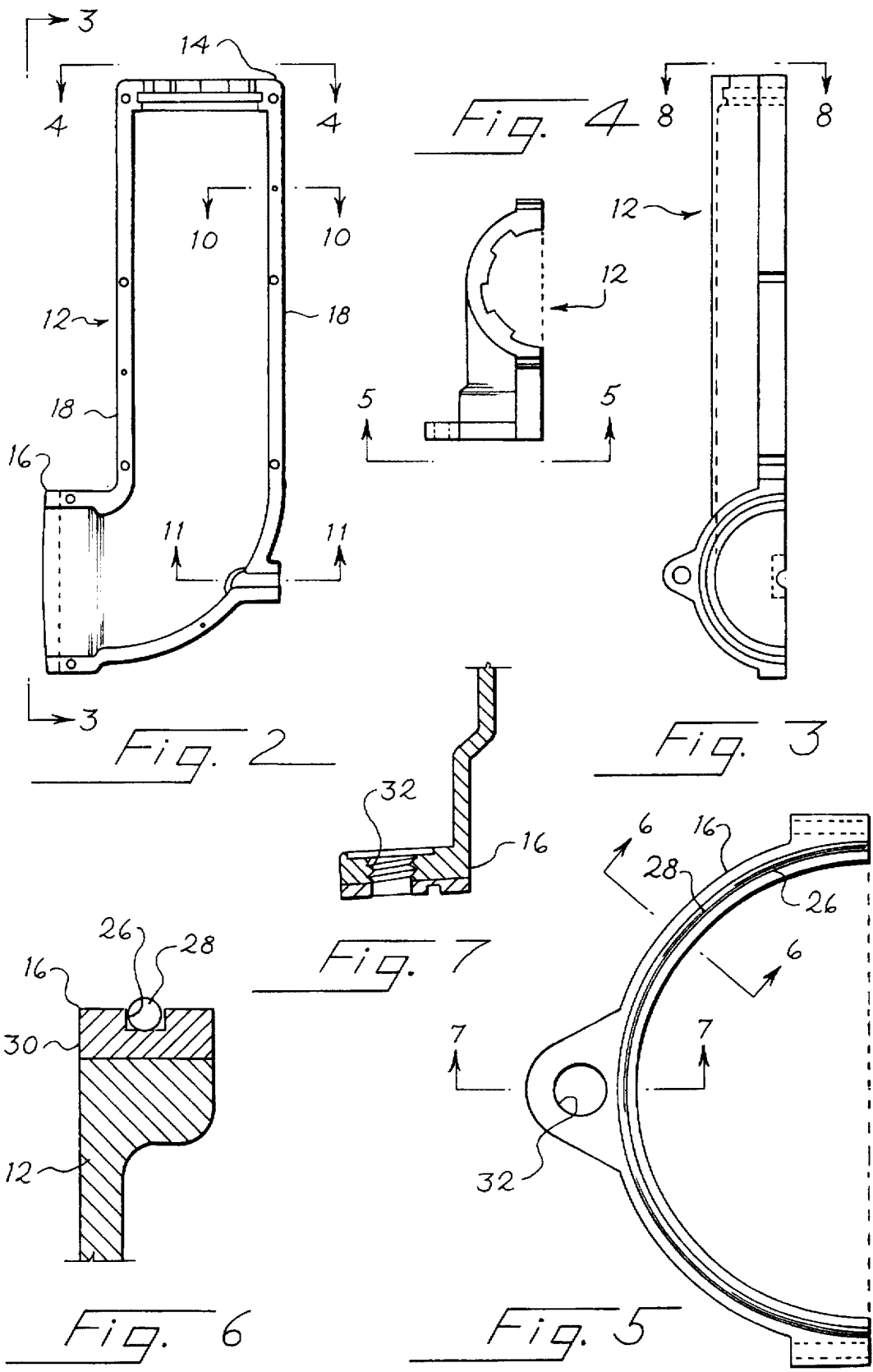

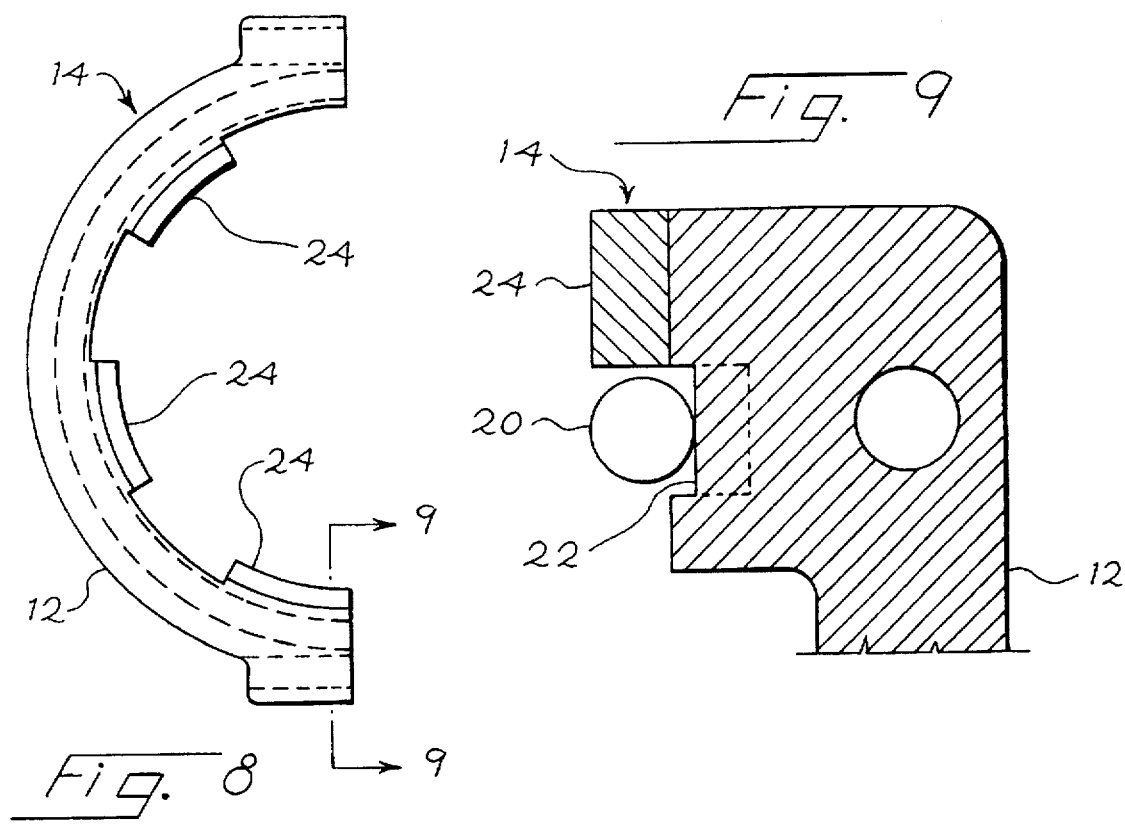
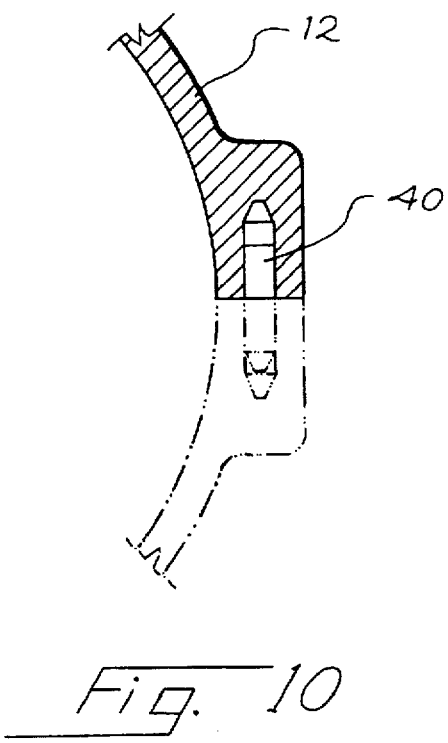
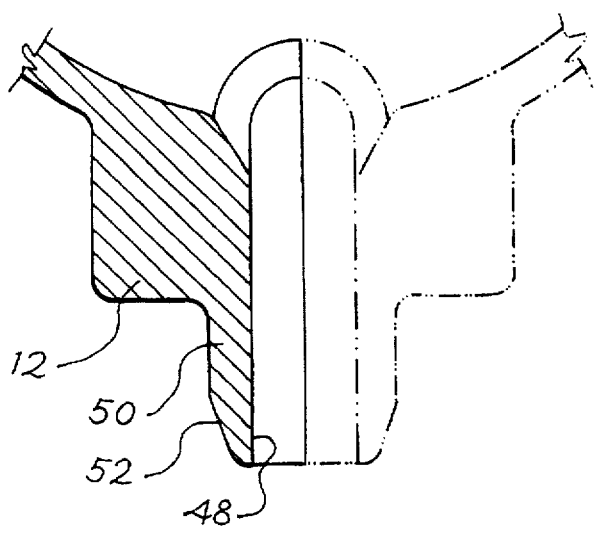

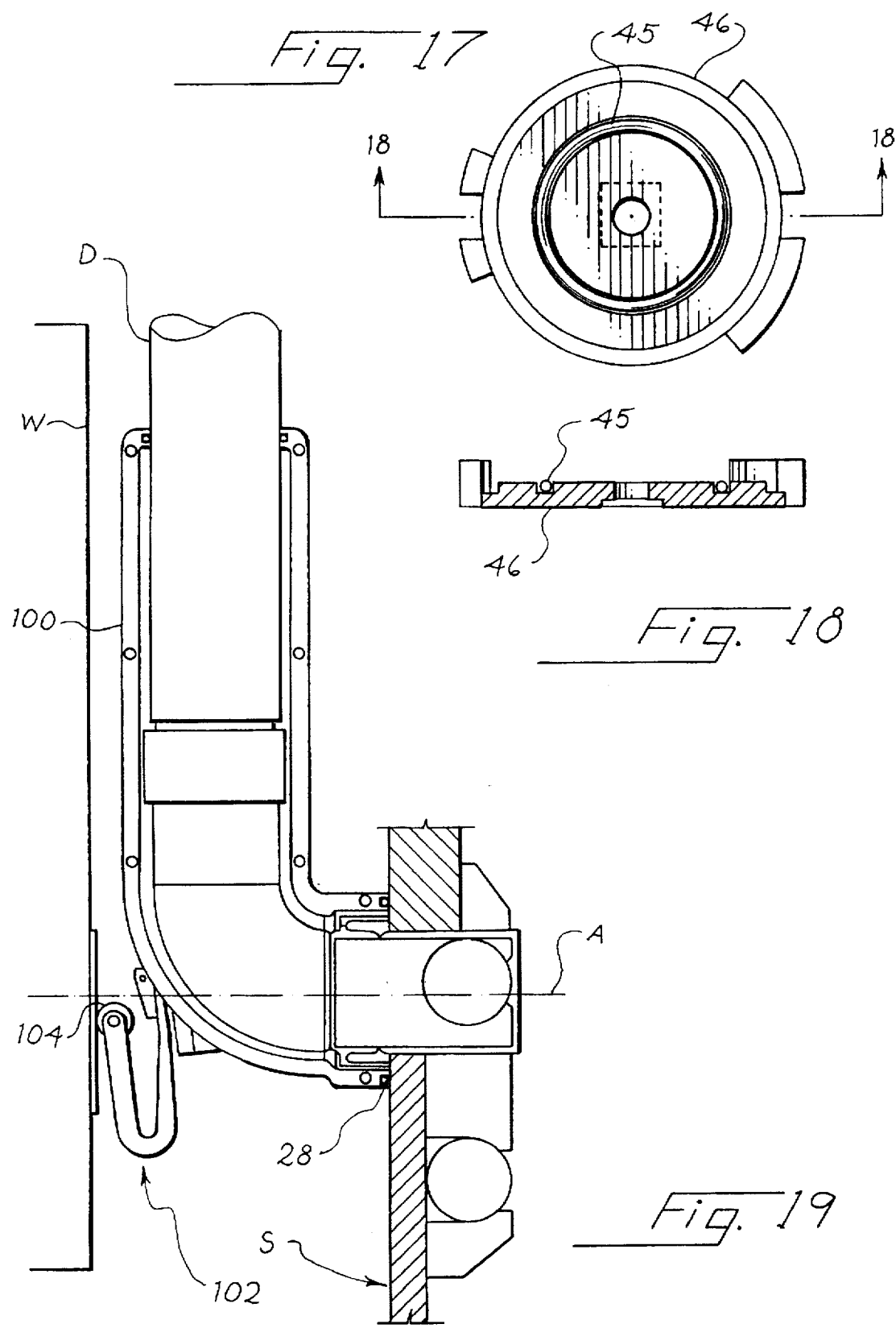

5,735,551

1

PIPE REPAIR APPARATUS AND METHOD

BACKGROUND OF THE INVENTION

This invention relates to a pipe repair method and apparatus. The preferred embodiment described below is particularly adapted to repair piping in the internal core spray system of a nuclear reactor.

Conventional boiling water nuclear reactors include internal core spray lines that bring core spray flow through the core shroud. Conventionally, a welded pipe assembly is included immediately outwardly from the core shroud. This section of piping is subject in some cases to cracking, as first detected in the late 1970's. This cracking, known as intergranular stress corrosion cracking (IGSCC), can result in leakage or even structural damage to the internal core spray lines.

Cracked core spray lines have in the past been repaired with bands that extend around the pipe at the crack. Such bands rely on the structural integrity of the pipe, and they may not be appropriate if the structural integrity of the pipe is in question.

A need presently exists for a method and apparatus for repairing such piping. Preferably, such a method and apparatus would be well adapted for remote installation, fast to install, reliable in use, and readily adapted to mate with the as-found conditions of a particular pipe configuration.

SUMMARY OF THE INVENTION

According to a first aspect of this invention, a pipe repair apparatus is provided comprising at least first and second housings. Each housing comprises respective first and second ends, and a pair of edges extending therebetween. The housings are configured to mate at the edges to form a closed conduit extending between the ends, and this conduit is shaped to receive a pipe to be repaired. A first seal is mounted in the housings to extend around the conduit at the first ends of the housings, and this first seal is oriented to seal the housings against an outer circumferential surface of the pipe. A second seal is mounted to the housings to extend around the conduit at the second ends of the housings, and this second seal is oriented to seal the housings against a wall extending outwardly from the pipe. A retainer is coupled to the housings to clamp the second seal against the wall. The pipe comprises a longitudinal axis adjacent to second ends of the housings, and the retainer presses the second seal along a direction having a substantial component along the longitudinal axis. In alterative embodiments, the retainer may take the form of a threaded rod or a spring.

According to a second aspect of this invention, a method is provided for repairing a core spray system comprising a core spray supply pipe in a nuclear reactor comprising a shroud which receives the pipe. According to this method, at least first and second housings are secured around the pipe such that the housings form a closed conduit around the pipe. This securing step comprises the step of sealing first ends of the housings to an outer surface of the pipe. Second ends of the housings are sealed to the shroud. The sealing step comprises the step of clamping the second ends against the shroud to form the seal.

The preferred embodiments described below provides cost-effective repairs for core spray supply pipes in a nuclear reactor.

2

Figure 1:
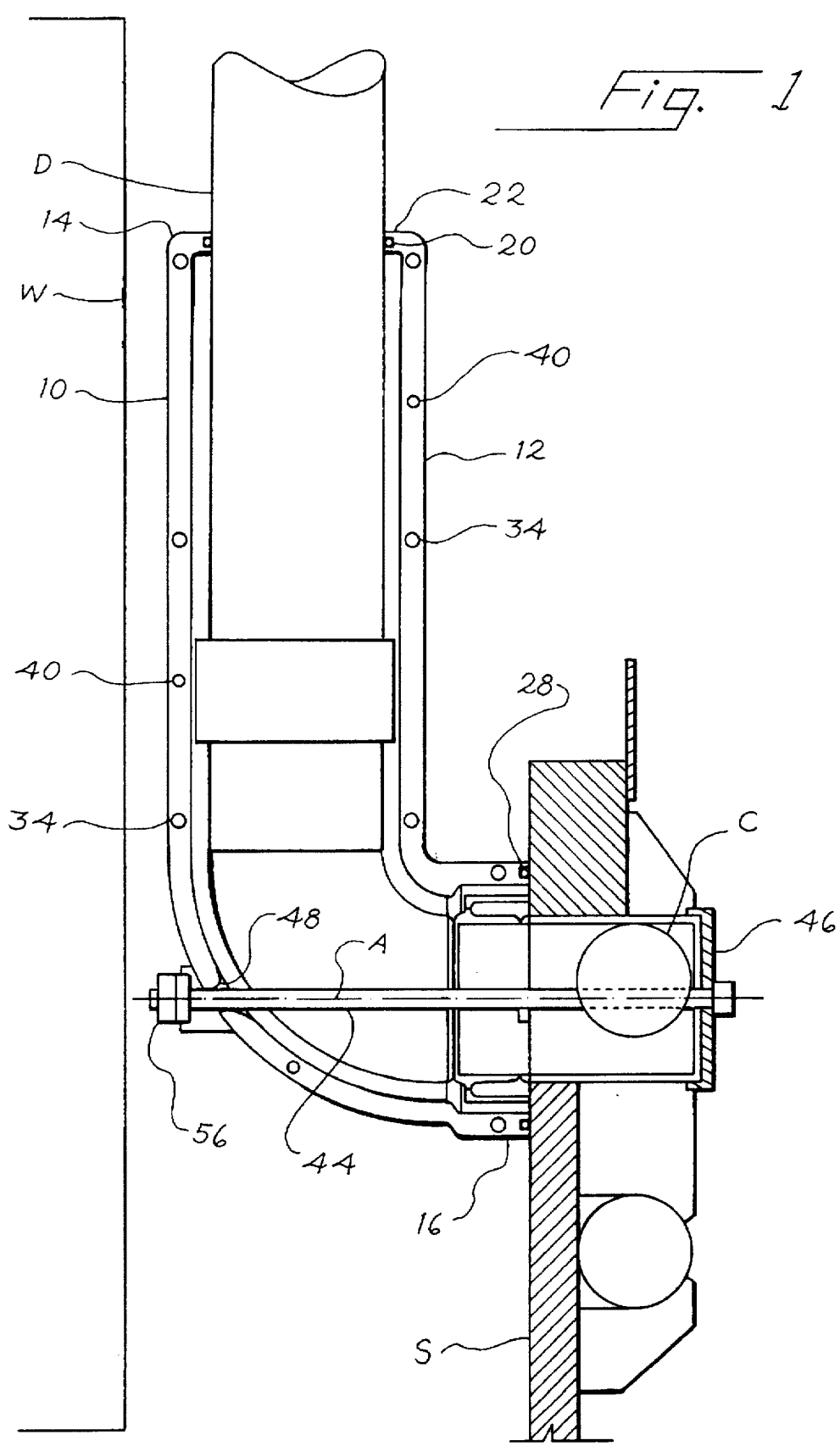
FIG. 1 is an elevational assembly drawing showing a preferred embodiment of the pipe repair of this invention mounted in place to a shroud of a nuclear reactor.

FIG. 2 is a side elevational view of one of the housings of the pipe repair of FIG. 1.

FIG. 3 is an elevational view taken along line 3—3 of FIG. 2.

FIG. 4 is a top view taken along line 4—4 of FIG. 2.

FIG. 5 is a view of the lower face of the housing of FIG. 2 taken along line 5—5 of FIG. 4.

FIG. 6 is a cross-sectional view taken along line 6—6 of FIG. 5.

FIG. 7 is a cross-sectional view taken along line 7—7 of FIG. 5.

FIG. 8 is a view of the upper face of the housing of FIG. 3, taken along line 8—8 of FIG. 3.

FIG. 9 is a cross-sectional view taken along line 9—9 of FIG. 8.

FIG. 10 is a cross-sectional view taken along line 10—10 of FIG. 2.

FIG. 11 is a fragmentary sectional view taken along line 11—11 of FIG. 2.

Figure 12:
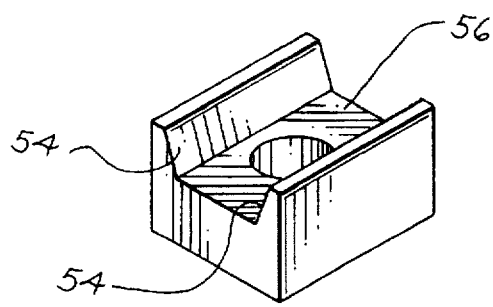

FIG. 12 is a perspective of a wedge block included in the embodiment of FIG. 1.

Figure 13:
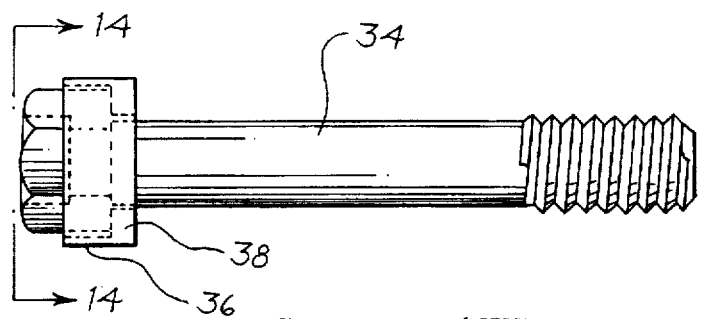

FIG. 13 is a plan view of a threaded fastener included in the embodiment of FIG. 1.

Figure 14:
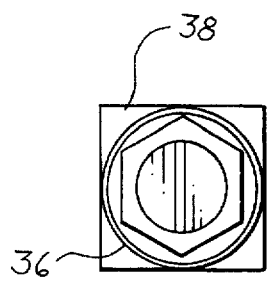

FIG. 14 is an end view taken along line 14—14 of FIG. 13, showing a retainer device.

Figure 15:
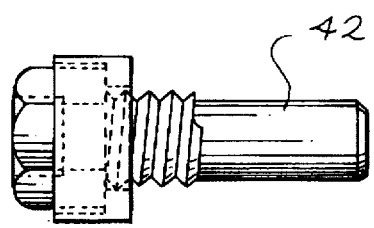

FIG. 15 is a side view of a threaded pin included in the embodiment of FIG. 1.

Figure 16:
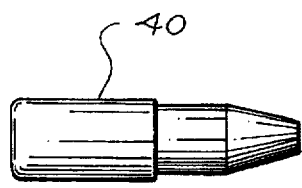

FIG. 16 is a side view of an alignment pin included in the embodiment of FIG. 1.

FIG. 17 is a plan view of a cap included in the embodiment of FIG. 1.

FIG. 18 is a cross-sectional view taken along line 18—18 of FIG. 17.

FIG. 19 is an assembly drawing of a second preferred embodiment of the pipe repair of this invention.

DETAILED DESCRIPTION OF THE PRESENTLY PREFERRED EMBODIMENTS

FIG. 1 shows selected portions of a boiling water nuclear reactor, including a core shroud S and a core spray sparger C. Core spray water is delivered to the core spray sparger by a vertically oriented pipe, known in the art as a core spray downcomer D. All of these elements are contained within the inside wall W of the reactor pressure vessel (RPV). The core spray downcomer D functions as a core spray supply pipe in the core spray system of the nuclear reactor. The downcomer D includes an elbow adjacent to the shroud S, and a number of welds are conventionally used to fabricate this portion of the downcomer. The elements of FIG. 1 discussed above are conventional, and have been described to define the environment in which the presently preferred embodiment of this invention is used.

FIG. 1 shows a pipe repair 10 mounted on the downcomer D. The pipe repair 10 includes two housings 12, which are mirror images of one another. In FIG. 1, one of the housings 12 is shown, and the other has been deleted for clarity of illustration.

FIGS. 2, 3 and 4 provide various overall views of one of the housings 12. As shown in FIG. 2, the housing 12 includes a first end 14 and a second end 16. The housing 12 is generally shaped to conform to the downcomer D in the region of the repair, and the housing 12 defines two longitudinal mating edges 18 which extend between the first and second ends 14, 16. The two housings 12 are shaped such that when the edges 18 of the two housings are mated, the housings form a closed conduit that is shaped to surround the downcomer D. This conduit is sealed at the first end by a seal 20 (FIG. 9) that resides in an annular groove 22 formed in the housing 12. In this embodiment the seal 20 is preferably an annular metal tube that is dimensioned to be compressed between the housings 12 and the downcomer D to seal the housings 12 against an outer circumferential surface of the downcomer D at the first end 14.

FIGS. 8 and 9 provide details of construction regarding the first end 14. As shown in FIGS. 8 and 9, the first end 14 defines radially inwardly directed protrusions 24 that are shaped to engage the outer surface of the downcomer D. As shown in FIG. 9, these protrusions 24 are preferably provided with a region that is built up of a material such as ER-209 weld material that can be machined after solution annealing, without becoming unduly susceptible to cracks and corrosion. The protrusions 24 allow the housings 12 to grip an irregular (out-of-round) downcomer D without crushing it.

FIGS. 5–7 provide details of construction regarding the second end 16. As shown in FIGS. 5 and 6, the second end defines a circular groove 26 that receives a seal 28. This seal 28 is positioned to create a seal against the outer surface of the shroud S, as shown in FIG. 1. As shown in FIG. 1, the outer surface of the shroud S forms a wall that extends outwardly from the downcomer D immediately adjacent to the second end 16 of the pipe repair 10. As shown in FIG. 6, the second end 16 is preferably provided with a region that is built up of a material such as ER-209 weld material that can be machined after solution annealing, without becoming unduly susceptible to cracks and corrosion. As shown in FIG. 7, the second end 16 of each housing 12 defines a threaded opening 32 that receives a threaded pin as described below to locate and align the housing 12 on the shroud S, and prevents lateral and torsional movement. The shroud S includes a mating recess (not shown) designed to receive the end of the threaded pin.

The openings 32 receive threaded pins 42, shaped as shown in FIG. 15.

As shown in FIG. 1, the housings 12 are held together by eight threaded fasteners such as bolts 34. The housings 12 are threaded to receive these bolts 34, such that the bolts 34 are captured in one of the housings 12, and then threaded into the other. In this way, loose hardware is eliminated to facilitate reliable remote assembly. As shown in FIGS. 13 and 14, the heads of the bolts 34 are surrounded by bolt head keepers that include tubular walls 36 that can be crimped around the bolt head to prevent loosening of the bolt. The tubular walls 36 are integrally formed with rectangular baseplates 38 that are shaped to engage complementary recesses in the housings 12 to prevent rotation of the baseplate 38 and therefore the wall 36.

The housings 12 also include three alignment pins 40 as shown in FIG. 10, which facilitate alignment at the time of assembly. One of the alignment pins 40 is shown in greater detail in FIG. 16. Each alignment pin 40 is press fit into one of the housings 12 and then releasably fit into the other.

The pipe repair 10 is structurally secured in place to the shroud S by a retainer which in this embodiment takes the form of a threaded rod 44 (FIG. 1). This rod reacts at one end against a cap 46 mounted on the inside of the shroud S, and at the other end on the pipe repair 10. The rod 44 clamps the second end 16 and the seal 28 firmly against the outer surface of the shroud S, to prevent leakage therebetween. As best shown in FIG. 1, the rod 44 extends along a longitudinal axis A defined by the lowermost portion of the downcomer D, through an opening formed in the downcomer D, and then through an aperture 48 in the pipe repair 10.

FIG. 11 shows a cross-sectional view that illustrates the housing 12 in the region of the aperture 48. Note that the housing 12 includes a protrusion 50 adjacent the aperture 48, and this protrusion 50 includes surfaces 52 that engage wedging surfaces 54 of a wedge block 56 (FIG. 12). A preferred embodiment of the cap 46 is shown in FIGS. 17 and 18. This cap 46 includes a seal 45 similar to the seals 20, 28 described above.

The pipe repair 10 described above can be installed as follows:

First the threaded fasteners 34 are installed in either one of the housings 12 so that the fasteners 34 are captured during installation. Then the threaded pins 42 are installed in the openings 32 so that the threaded pins 42 are captured during installation, and the alignment pins 40 are press fit into either one of the housings 12.

The two housings 12 are installed in place around the downcomer D, the threaded pins 42 are aligned with the corresponding sockets in the shroud S, and the eight threaded fasteners 34 are tightened to achieve a flush fit. The rod 44 is then installed from the inside of the core shroud S into the aperture 48 of the housings 12. The wedge block 56 is then threaded on to the rod 44. As the rod 44 is rotated to clamp the pipe repair 10 against the shroud S, the wedging surfaces 54 of the wedge block 56 press the surfaces 52 of the protrusions 50 together to hold the housings 12 together. Then the lower two sets of threaded fasteners 34 are tightened to final torque, the rod 44 is tightened to final torque, and finally the upper two sets of threaded fasteners 34 are tightened to final torque. Bolt head keepers are crimped as required to prevent loosening of the bolts.

Prior to installation, the diameter and ovality of the downcomer D can be measured at the point where the upper seal 20 will contact the downcomer D. The protrusions 24 can then be field machined to obtain a proper fit. Similarly, the horizontal alignment of the downcomer D from the center line of the core shroud S penetration to the location of the top surface of the housings 12 is measured. Any skewing of the housings 12 can be determined and then addressed by field machining the region 30.

FIG. 19 shows an assembly drawing of a second embodiment 100 of the pipe repair of this invention. The pipe repair 100 is substantially identical to the pipe repair 10 described above, except that the threaded rod 44 is deleted. In this case, the pipe repair 100 is retained in place against the shroud S by a spring fixture 102. The spring fixture 102 includes a roller 104 that reacts against the wall W of the nuclear reactor vessel. The spring fixture 102 is secured at one end to the pipe repair 100 in alignment with the axis A, and acts to clamp the seal 28 firmly against the shroud S.

The following details of construction are provided to define the best mode known to the inventors at the time of filing. These details of construction are of course intended only by way of illustration. Preferably, all structural elements are formed of solution annealed XM-19 austenitic stainless steel, having a maximum carbon content of 0.045 wt %. Minor components may also be formed of the same material. The housings 12 are preferably cast from ASTM-A-351, type CF3M 316NG stainless steel with a maximum carbon content of 0.020 wt % and a maximum cobalt content of 0.01 wt %, and a nitrogen content that is between 0.06 and 0.10 wt %. The material used for the protrusions 24 and the regions 30 is preferably a hard face weld buildup made from ER 209 (Nitronic 50) welding material, having a chemical composition in accordance with specification SFA-5.9 with a maximum carbon content of 0.035 wt %.

By way of example, the seals 20, 28, 45 may be formed of 18 gauge stainless steel tubing (ASTM A-213, grade 316L stainless steel). The seal 20 can have a tubular diameter of between 0.375 and 0.500 inches and an internal annular radius between 3.50 and 3.563 inches. The tubing is preferably fabricated with one inch excess length on both ends to allow for field fit-up. Preferably, the installer cuts the tubing flush with the housings and then tack welds the tubing in place prior to installation. In this way, the seal 20 can be adapted for the as-found conditions. Similarly, the seal 28 can be formed of the same material having a tubular diameter in the range of 0.250 to 0.375 inches, and a centerline annular radius of 5 inches. Preferably, the seals 20, 28, 45 are tack welded in place to insure that they remain attached to the housings 12 during assembly, and the seal 45 is tack welded to the cap 46.

Preferably, the following sequence of fabrication is used. First, the right and left housings 12 are fabricated using the investment casting process. Then the remaining components are fabricated by machining or other standard fabrication methods using the specified materials. The weld buildup of ER 209 material is applied at the protrusions 24 and the region 30 as described above. Then holes, threads, fit-up surfaces and the like are machined as described above, and the various components are then inspected for fit-up. Solution annealing is then performed on the final, as-fabricated components. Special care should be taken to minimize and avoid warpage of components during the solution annealing process. Following solution annealing, a final fit-up check should be performed to verify proper mating of the overall assembly. Special attention should be placed on verifying a flush mating surface of the two halves at the edges 18. Further, any welding should comply with ASME Section III, subsection NG-4000 welding procedures and should be in accordance with ASME Section IX requirements. All welded components should be solution annealed after welding.

In general, machining, including grinding, should be done prior to solution annealing of any components. For electrical discharge machined (EDM) surfaces, in stressed structural applications such as the threaded openings, samples for each EDM process should be prepared, and the EDM surfaces sectioned and metallographically examined. Micro-cracking should be avoided.

All components should be liquid penetrant and volumetrically examined per the requirements of Section III, subsection NG of the ASME code. All welds should be examined per the requirements of Section III, subsection NG, article NG-5000, and Section V of the ASME code.

During installation, all parts, including all threaded fasteners and other small parts, should be secured by a proven method, and all hardware and tooling should be cleaned and inspected for cleanliness prior to use in the reactor.

From the foregoing, it should be apparent that the pipe repair 10, 100 is installed around the existing downcomer D to structurally replace any cracked welds, and to contain leakage. In this way, the core spray system can be repaired in an economical fashion to maintain its function and operability. The pipe repair 10, 100 does not rely upon the continued structural integrity of the welds in the region of the elbow of the downcomer D in order to fulfill its design function. Additionally, the pipe repair 10, 100 acts to limit leakage experienced from a through-wall crack in the downcomer D.

The pipe repair 10, 100 provides important advantages in use. It provides a permanent repair that structurally replaces the piping and welds covered by the housing 12. The pipe repair 10, 100 is designed to allow for inspection access to other adjacent welds that are not covered by the repair 10, 100. The repair 10, 100 has been designed to allow for remote installation with minimal as-built information and in a minimal amount of time. The total number of components has been kept to a minimum.

The pipe repair 10, 100 provides a leakage barrier with a nominal amount of leakage under design conditions. This leakage barrier is in part attributable to the seals 20, 28.

The pipe repair 10, 100 provides features which minimize IGSCC susceptibility in the finished product, while allowing for field machining to allow the repair 10, 100 to mate properly with the as-built piping configuration.

The pipe repair 10, 100 provides a comprehensive solution to the deterioration of the welds most susceptible to failure near the elbow of the downcomer D, and it can be installed over uncracked, partially cracked, or fully cracked piping. The design illustrated above utilizes mechanical restraining devices to lock threaded components in place after installation to substantially eliminate inadvertent loosening.

Of course, it should be understood that the foregoing detailed description has been provided by way of example. Many variations are possible to the preferred embodiments described above. For example, the housings 12 can be machined or cast to allow for the geometric shape requirements of the particular application. Furthermore, the pipe repair can be formed as an in-line repair, and does not in all cases have to define an elbow as shown above. Materials, dimensions, proportions, and fabrication techniques can all be varied as appropriate for the particular application. Furthermore, various fastening approaches can be used, including various types of clamps, welds, and threaded fasteners. The invention is not limited to use with seals of the type described above, but instead any suitable sealing technology can be adapted to use for this invention. If desired, three or more housings may be secured together as part of a multiple piece assembly to form the conduit around the pipe being repaired.

It is therefore intended that the foregoing detailed description be regarded as an illustration, and not as a limitation of the invention. It is only the following claims, including all equivalents, which are intended to define the scope of this invention.

We claim:

1. A pipe repair apparatus comprising:
    at least first and second housings, each housing comprising respective first and second ends, and a pair of edges extending therebetween, said housings configured to mate at the edges;
    a plurality of fasteners securing the first and second housings together to form a closed conduit extending between the ends, said conduit shaped to receive a pipe to be repaired;
    a first seal mounted in the housing to extend around the conduit at the first ends of the housings, said first seal oriented to seal the housings against an outer circumferential surface of the pipe;
    a second seal mounted to the housings to extend around the conduit at the second ends of the housings, said second seal oriented to seal the housings against a wall extending outwardly from the pipe;
    a retainer coupled to the housings to clamp the second seal against the wall, said pipe comprising a longitudinal axis adjacent to the second ends of the housings, said retainer pressing the second seal along a direction having a substantial component aligned with the longitudinal axis.

2. The invention of claim 1 wherein the plurality of fasteners comprises a plurality of threaded fasteners securing the first and second housings together, each fastener secured in a respective one of the housings.

3. The invention of claim 1 wherein the retainer comprises a rod extending between the housings and the wall.

4. The invention of claim 3 wherein the rod extends through the pipe, aligned with the longitudinal axis.

5. The invention of claim 4 wherein the rod extends out of the housings via an aperture formed at the edges.

6. The invention of claim 5 wherein the retainer further comprises a wedge block adjacent to the housings, said wedge block comprising two opposed wedge surfaces, each wedge surface positioned to engage a respective one of the housings to urge the edges of the housings together.

7. The invention of claim 1 wherein the retainer comprises a spring mounted to the housings, said spring configured to react against a surface positioned to a side of the housings opposed to the second seal.

8. The invention of claim 1 wherein the housings are shaped to form the conduit in an elbow configuration.

9. The invention of claim 1 wherein the housings comprise a plurality of spaced protrusions adjacent the first seal and oriented to extend radially inwardly, toward the pipe.

10. A method for repairing a core spray system comprising a core spray supply pipe in a nuclear reactor comprising a shroud which receives the pipe, said method comprising the following steps:

a) securing at least first and second housings around the pipe such that the housings form a closed conduit around the pipe, said securing step comprising the step of sealing a first end of the housings to an outer surface of the pipe; and b) sealing a second end of the housings to the shroud, said sealing step comprising the step of clamping the second end against the shroud.

11. The method of claim 10 wherein steps (a) and (b) comprise the step of mechanically holding the housings in place with respect to the shroud.

12. The method of claim 10 wherein the securing step comprises the step of securing the housings around the pipe with threaded fasteners.

13. The invention of claim 10 wherein the sealing step comprises the step of installing a threaded rod that reacts at one end against the housings and at the other end against a reaction surface that is fixedly positioned with respect to the shroud.

* * * * *